US010604048B2

(12) United States Patent
Vela et al.

(10) Patent No.: US 10,604,048 B2
(45) Date of Patent: Mar. 31, 2020

(54) HAPTIC SYSTEM: RECLINE ACTIVATION CONTROL

(71) Applicant: Safran Seats USA LLC, Gainesville, TX (US)

(72) Inventors: Merardo Vela, Colonia Guadalupe (MX); Patricia Luevano, Chih (MX)

(73) Assignee: Safran Seats USA LLC, Gainesville, TX (US)

( * ) Notice: Subject to any disclaimer, the term of this patent is extended or adjusted under 35 U.S.C. 154(b) by 224 days.

(21) Appl. No.: 15/551,934

(22) PCT Filed: Jan. 20, 2016

(86) PCT No.: PCT/US2016/014071
§ 371 (c)(1),
(2) Date: Aug. 18, 2017

(87) PCT Pub. No.: WO2016/133638
PCT Pub. Date: Aug. 25, 2016

(65) Prior Publication Data
US 2018/0065521 A1 Mar. 8, 2018

Related U.S. Application Data

(60) Provisional application No. 62/118,742, filed on Feb. 20, 2015.

(51) Int. Cl.
*B60N 2/23* (2006.01)
*B60N 2/75* (2018.01)
(Continued)

(52) U.S. Cl.
CPC ........... *B60N 2/797* (2018.02); *B60N 2/0228* (2013.01); *B60N 2/231* (2013.01); *B64D 11/064* (2014.12); *B60N 2002/0268* (2013.01)

(58) Field of Classification Search
CPC ...... B60N 2/231; B60N 2/797; B60N 2/4693; B60N 2002/0268; B64D 11/064; B64D 11/0646; A47C 1/0244
(Continued)

(56) References Cited

U.S. PATENT DOCUMENTS 2,599,079 A * 6/1952 Tatom ................ B61D 33/0092
188/67
3,528,532 A * 9/1970 Moskow ................ B60N 2/231
188/300
(Continued)

FOREIGN PATENT DOCUMENTS

CH        491763 A * 6/1970 ............. B60N 2/231
DE    102010033752 A1 * 2/2012 ............. B60N 2/181
(Continued)

OTHER PUBLICATIONS 6 page PDF of a Google Machine Translation of WO 02/16161. (Year: 2002).*
(Continued)

*Primary Examiner* — Robert Canfield
(74) *Attorney, Agent, or Firm* — Kilpatrick Townsend & Stockton LLP; Dean W. Russell; Melissa L. Love

(57) ABSTRACT

An electronically-activated support positioning system for a passenger seat can include a sensor capable of detecting a tactile input from a passenger and sending a signal, optionally through a controller, to a lock actuator coupled to a lockable hydraulic spring to either lock or unlock the lockable hydraulic spring. The lockable hydraulic spring can control movement of a support of the passenger seat, such as reclining of a seatback. In an example, when tactile input is detected, the lock actuator can unlock the lockable hydraulic spring, allowing an attached seatback to be adjusted. When tactile input is no longer detected, the lock actuator can lock the lockable hydraulic spring, securing the seatback from
(Continued)

adjustment. The sensor can be sufficiently small to fit within the confines of an armrest. The sensor can be a microswitch positioned to detect deflection of a tab formed in the wall of the armrest.

23 Claims, 9 Drawing Sheets

(51) Int. Cl.
*B64D 11/06* (2006.01)
*B60N 2/02* (2006.01)

(58) Field of Classification Search
USPC .......................... 297/217.3, 362.13; 701/49
See application file for complete search history.

(56) References Cited

U.S. PATENT DOCUMENTS

| | | | | |
|---|---|---|---|---|
| 3,533,658 A * | 10/1970 | Gropp | ................ | B60N 2/231 297/362.13 |
| 3,572,829 A * | 3/1971 | Malitte | ................ | B64D 11/06 297/317 |
| 5,743,591 A * | 4/1998 | Tame | ................ | B60N 2/231 297/216.1 |
| 7,137,594 B2 * | 11/2006 | Mitchell | ................ | B64D 11/00 244/118.6 |
| 9,789,964 B2 * | 10/2017 | Garing | ................ | B64D 11/0639 |
| 9,981,571 B2 * | 5/2018 | Garing | ................ | B60N 2/231 |
| 10,220,949 B2 * | 3/2019 | Thomaschewski | .. | B64D 11/064 |
| 10,239,621 B2 * | 3/2019 | Hoch | ................ | B64D 11/06 |
| 10,300,811 B2 * | 5/2019 | Bonk | ................ | B60N 2/0244 |
| 2002/0069753 A1 * | 6/2002 | Lauderbach | ........ | F16F 9/0263 92/137 |
| 2004/0080191 A1 * | 4/2004 | Bartlett | ................ | A47C 1/034 297/85 M |
| 2004/0195875 A1 * | 10/2004 | Skelly | ................ | B60N 2/0252 297/217.3 |
| 2008/0030053 A1 * | 2/2008 | Kamba | ................ | A61H 1/003 297/217.3 |
| 2008/0255734 A1 * | 10/2008 | Altshuller | ............ | B60N 2/0244 701/49 |
| 2010/0109407 A1 * | 5/2010 | Broering | ................ | A61G 15/02 297/362.13 |
| 2011/0166751 A1 * | 7/2011 | Bauer | ................ | B64D 11/00 701/49 |
| 2011/0238256 A1 * | 9/2011 | Heeg | ................ | B60N 2/0232 701/31.4 |
| 2012/0217779 A1 * | 8/2012 | Gaither | ................ | B60N 2/242 297/316 |
| 2012/0226418 A1 * | 9/2012 | Veen | ................ | B60N 2/0232 701/49 |
| 2015/0057894 A1 * | 2/2015 | Jung | ................ | B60W 50/0098 701/49 |
| 2015/0274038 A1 * | 10/2015 | Garing | ................ | B60N 2/231 74/89.2 |
| 2015/0375865 A1 * | 12/2015 | Fischer | ................ | B60N 2/919 701/49 |
| 2017/0015422 A1 * | 1/2017 | Garing | ............... | B64D 11/0639 |
| 2017/0043681 A1 * | 2/2017 | Seiller | ................ | B60N 2/0248 |
| 2017/0334563 A1 * | 11/2017 | Senneff | ................ | B64D 11/064 |

FOREIGN PATENT DOCUMENTS

| | | | | |
|---|---|---|---|---|
| EP | 0185536 A2 | 6/1986 | | |
| EP | 0329455 A1 * | 8/1989 | ............ | F16F 9/0209 |
| JP | H06277126 A | 10/1994 | | |
| WO | 2002016161 A1 | 2/2002 | | |
| WO | WO-2016133638 A1 * | 8/2016 | ............ | B60N 2/231 |

OTHER PUBLICATIONS 4 page PDF machine translation of JP, 06-277126, A. (Year: 1994).*
International Patent Application No. PCT/US2016/014071, Search Report and Written Opinion, dated May 10, 2016.

* cited by examiner

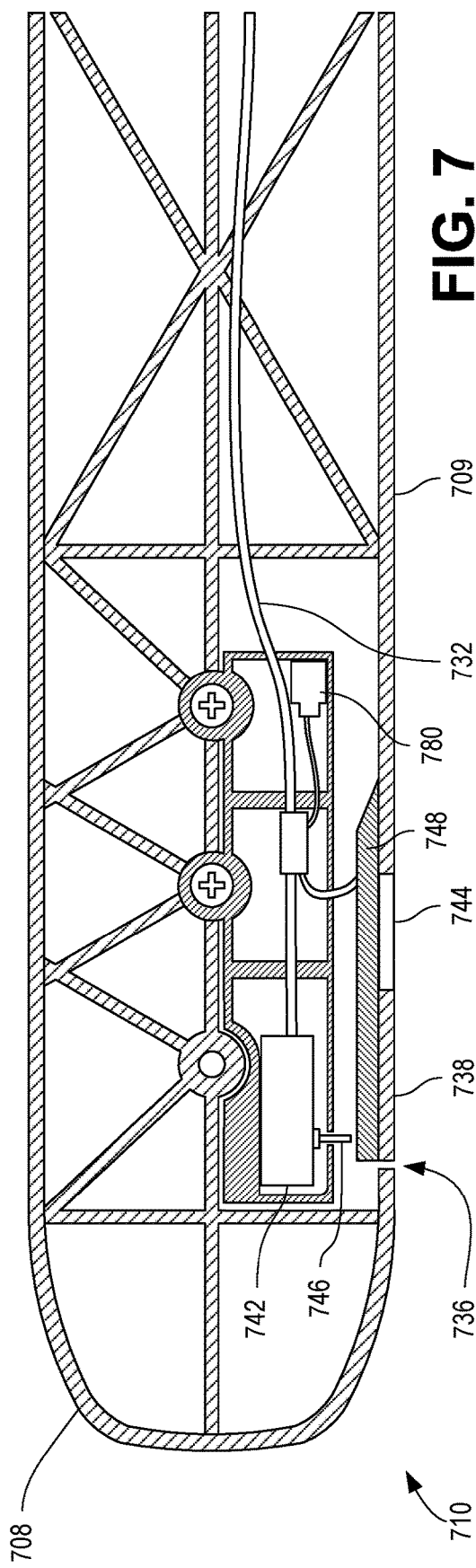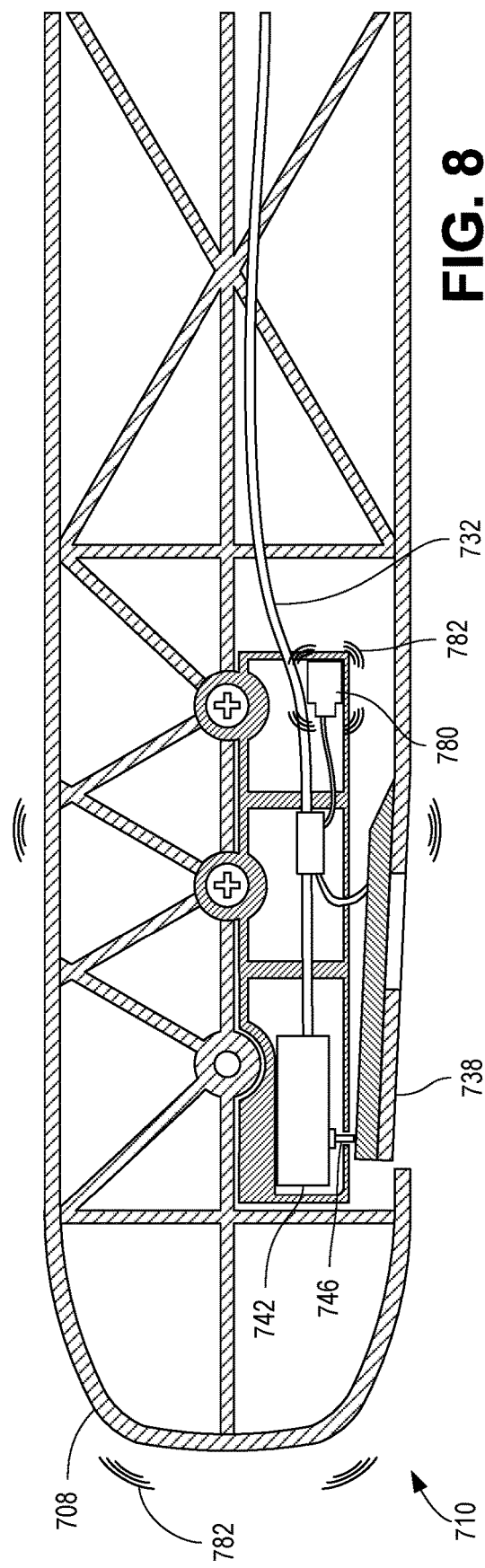

HAPTIC SYSTEM: RECLINE ACTIVATION CONTROL

CROSS REFERENCE TO RELATED APPLICATIONS

This patent application is the U.S. national stage entry of PCT/US2016/014071 ("the '071 application"), filed on Jan. 20, 2016, which application is related to and claims priority benefits from U.S. Provisional Application Ser. No. 62/118, 742 ("the '742 application"), filed on Feb. 20, 2015, entitled "HAPTIC SYSTEM: RECLINE ACTIVATION CONTROL." The '071 and '742 applications are hereby incorporated in their entireties by this reference.

FIELD OF THE INVENTION

The field of the invention relates to passenger seats generally and more specifically to reclining functionality on passenger seats.

BACKGROUND

Passenger seats used in many environments, such as aircraft seats used in private and commercial air travel, may include adjustment options that allow a passenger to manipulate one or more supports associated with the seat. For example, passenger seats may include a system for reclining the seatback. The system may include a lockable actuator, such as a lockable hydraulic spring, to allow the passenger to selectively keep the support in a desired position or adjust the support to a new position. The activation of these lockable actuators has been accomplished through the use of fully mechanical linkages, such as a large plunger on an armrest that manipulates a mechanical control cable coupled to a lockable hydraulic spring. Mechanical linkages and the like can occupy substantial volume and can impart substantial weight on a passenger seat, limiting the placement options for the mechanical linkages, limiting the construction options for the passenger seat, and negatively impacting the efficiency of any vehicle in which the passenger seats may be used.

In passenger seat construction, there may be a desire to incorporate designs that invoke innovation, technological appreciation, and the feeling of open space, among other aesthetic goals. These aesthetic goals may be especially useful to give competing carriers, such as airlines, a competitive advantage as offering a more pleasing travel experience. For example, design innovations in aircraft seats in recent years have resulted in thinner and more aesthetically pleasing seats. However, the reliance on mechanical linkages as described above can limit design options for invoking desired aesthetic goals.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a recline control system includes a lockable hydraulic spring couplable to a passenger seat to control movement of a portion of the passenger seat, the lockable hydraulic spring actuatable between a locked state and an unlocked state. The recline control system further includes a lock actuator coupled to the lockable hydraulic spring for controlling a lock state of the lockable hydraulic spring and a sensor for sensing a tactile input, the sensor operatively coupled to the lock actuator to initiate actuation of the lockable hydraulic spring in response to sensing the tactile input.

In some embodiments, the portion of the passenger seat is be a seatback and the lockable hydraulic spring controls reclining of the seatback. In some embodiments, the lockable hydraulic spring includes a locking pin for controlling the lock state of the lockable hydraulic spring and the lock actuator includes a servo coupled to a hinge, the servo actuatable to deflect the hinge to depress the locking pin. In some embodiments, the sensor includes a button mountable in an armrest of the passenger seat to detect a deflection of a surface of the armrest, and the tactile input is the deflection of the surface of the armrest. In some embodiments, the sensor is mountable in an armrest of the passenger seat to detect pressure applied to a surface of the armrest and the tactile input is the pressure applied to the surface of the armrest. In some embodiments, the sensor is mountable in an armrest of the passenger seat and the recline control system further comprises an illumination source positionable proximate the sensor. In some embodiments, the recline control system further comprises a controller operatively coupled between the sensor and the lock actuator. In some embodiments, the recline control system further comprises a feedback actuator operatively coupled to the controller to generate a feedback sensation associated with actuation of the lockable hydraulic spring to an unlocked state.

According to certain embodiments of the present invention, a passenger seat includes a seat frame, a support coupled to the seat frame and maneuverable between a stowed position and a deployed position, and a lockable hydraulic spring couplable to the support to control movement of the support between the stowed position and the deployed position, the lockable hydraulic spring actuatable between a locked state and an unlocked state. The passenger seat further includes a lock actuator coupled to the lockable hydraulic spring for controlling a lock state of the lockable hydraulic spring and a sensor for sensing a tactile input, the sensor operatively coupled to the lock actuator to initiate actuation of the lockable hydraulic spring in response to sensing the tactile input.

In some embodiments, the support is a seatback pivotally coupled to the seat frame to pivot between the stowed position and the deployed position. In some embodiments, the lockable hydraulic spring includes a locking pin for controlling the lock state of the lockable hydraulic spring and the lock actuator includes a servo coupled to a hinge, the servo actuatable to deflect the hinge to depress the locking pin. In some embodiments, the passenger seat further includes an armrest coupled to the seat frame, the armrest having a separation in an external surface of the armrest forming a deflectable tab, wherein the sensor includes a button mounted in the armrest to detect deflection of the deflectable tab, and wherein the tactile input is the deflection of the deflectable tab. In some embodiments, the passenger seat further includes an armrest coupled to the seat frame, wherein the sensor is mountable in the armrest to detect pressure applied to a surface of the armrest, and wherein the tactile input is the pressure applied to the surface of the armrest. In some embodiments, the passenger seat further includes an armrest coupled to the seat frame, wherein the sensor is mountable in the armrest, and wherein the passenger seat further comprises an illumination source positionable proximate the sensor. In some embodiments, the passenger seat further includes a controller operatively coupled between the sensor and the lock actuator. In some embodiments, the passenger seat further includes a feedback actuator operatively coupled to the controller to generate a feedback sensation associated with actuation of the lockable hydraulic spring to an unlocked state.

According to certain embodiments of the present invention, a method includes sensing a tactile input by a sensor mounted in an armrest of a passenger seat and generating a sensor signal in response to sensing the tactile input; and activating a lock actuator in response to generating the sensor signal, wherein activating the lock actuator includes depressing a locking pin of a lockable hydraulic spring.

In some embodiments, the method further includes receiving the sensor signal by a controller; and transmitting a control signal in response to receiving the sensor signal, wherein activating the lock actuator in response to generating the sensor signal includes receiving the control signal and activating the lock actuator in response to receiving the control signal. In some embodiments, the method further includes determining, by the controller, to unlock the lockable hydraulic spring based on the sensor signal, wherein transmitting the control signal occurs in response to determining to unlock the lockable hydraulic spring. In some embodiments, the method further includes receiving, by the controller, a master lockout signal, wherein determining to unlock the lockable hydraulic spring is further based on the master lockout signal. In some embodiments, the method further includes transmitting a feedback control signal in association with transmitting the control signal, wherein the feedback control signal, when received by the feedback actuator, causes the feedback actuator to generate a feedback sensation indicative of actuation of the lockable hydraulic spring to an unlocked state. In some embodiments, activating the lock actuator includes actuating a servo in response to generating the sensor signal to deflect a hinge, wherein the hinge depresses the locking pin upon deflection. In some embodiments, the armrest includes a surface and a separation in the surface that forms a deflectable tab, wherein sensing the tactile input includes detecting deflection of the deflectable tab.

BRIEF DESCRIPTION OF THE DRAWINGS

The specification makes reference to the following appended figures, in which use of like reference numerals in different figures is intended to illustrate like or analogous components.

FIG. 7 is a section-cutaway, top view of an armrest with an electronically-activated recline control in an inactivated position according to certain aspects of the present disclosure.

FIG. 8 is a section-cutaway top view of an armrest with an electronically-activated recline control in a depressed position according to certain aspects of the present disclosure.

DETAILED DESCRIPTION

Figure 1:
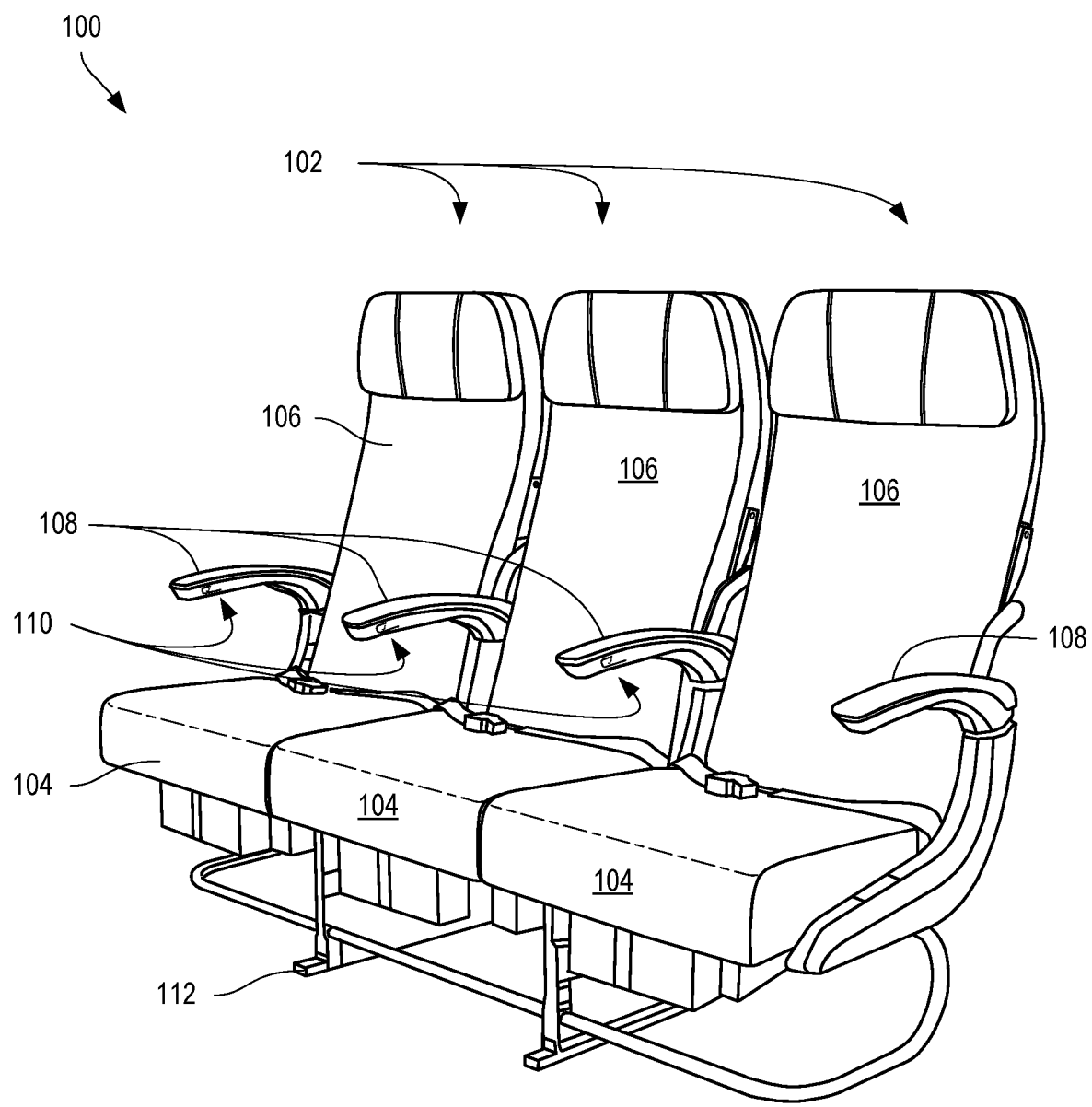
FIG. 1 is an axonometric view of a set of passenger seats having electronically-activated recline controls according to certain aspects of the present disclosure.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Certain aspects and features of the present disclosure relate to an electronically-activated support positioning system for a passenger seat. The system can include a sensor capable of detecting a tactile input from a passenger. The sensor can relay a signal, optionally through a controller, to a lock actuator that is coupled to a lockable hydraulic spring to either lock or unlock the lockable hydraulic spring. The lockable hydraulic spring can control movement of a support of the passenger seat, such as reclining of a seatback of the seat. In an example, when a tactile input is detected, the lock actuator can unlock the lockable hydraulic spring, allowing the seatback or other support to be moved or manipulated. When tactile input is no longer detected, the lock actuator can then lock the lockable hydraulic spring, allowing the seatback or other support to retain its position. The sensor can be sufficiently small to fit within the confines of an armrest. In some cases, the sensor is a microswitch positioned to detect deflection of a tab formed in the wall of the armrest.

The described embodiments of the invention provide electronically-activated support positioning systems for passenger seats. While certain aspects and features of the present disclosure are discussed for use with aircraft seats, they are by no means so limited. Rather, embodiments of electronically-activated support positioning systems may be used in passenger seats or other seats of any type or otherwise as desired.

An electronically-activated support positioning system can include a sensor for detecting a tactile input. The sensor can be any suitable sensor capable of detecting a passenger's intention to control positioning of the support (e.g., seatback). Any sensor capable of detecting a tactile input can be used. As used herein, the term tactile input can be any touching, tapping, depressing, deflecting, or other contact with a surface. A tactile input can be applied to a surface of the armrest, a surface of a button or pad, a surface of a sensor, or the like. Any suitable sensor can be used that is capable of detecting the tactile input, either directly (e.g., a sensor that is a microswitch that detects mechanical deflecting of a surface in contact with the sensor) or indirectly (e.g., a sensor that is a capacitive inductance sensor that detects the presence of a finger pressing a surface proximate the sensor). Examples of suitable sensors include mechanical buttons (e.g., a microswitch), pressure sensors (e.g., piezo-electric sensors), proximity sensors (e.g., capacitive inductance sensors), optical sensors, accelerometers, temperature sensors, and others. In some cases, a sensor can be used to detect a non-tactile input, such as a proximity input, which can be used in place of a tactile input for the purposes disclosed herein.

The sensor is capable of generating an electrical sensor signal, which can be used by a controller or a lock actuator to lock or unlock a lockable hydraulic spring. A sensor signal can be an active signal (e.g., a voltage or digital signal generated by the sensor) or a passive signal (e.g., the opening or closing of a circuit). The sensor signal can be transmitted through a wire or through a wireless radio. Since the sensor provides an electrical signal instead of needing to relay a mechanical force, the sensor can be relatively small and can be positionable in a multitude of locations. In some cases, the sensor can be coupled to or positioned within the housing of an armrest. In some cases, the armrest can include a wall having a separation that forms a deflectable tab. The sensor can be placed within the armrest and operatively coupled with the deflectable tab to detect deflection of the deflectable tab. In some cases, a window, cover, button, passthrough, or other feature is included in a wall of the armrest, by which the sensor can sense the tactile input.

In some cases, a controller can be used to process the sensor signal and provide a control signal to a lock actuator to lock or unlock a lockable hydraulic spring. Any suitable controller can be used, such as a microcontroller, a processor, a programmable logic controller, or others. In some cases, the controller can provide additional timing functionality, such as maintaining the lockable hydraulic spring in an unlocked state for a duration that is longer or shorter than the duration of the tactile input as indicated by the sensor signal.

In some cases, the controller can make a determination about whether to lock or unlock the lockable hydraulic spring based on the sensor signal. For example, when a sensor provides a digital sensor signal (e.g., open circuit or closed circuit), the controller can determine to unlock the lockable hydraulic spring whenever the sensor signal is closed (e.g., tactile input is detected). In another example, when a sensor provides an analog sensor signal (e.g., a capacitive inductance sensor providing a signal that varies with proximity), the controller can determine to unlock the lockable hydraulic spring whenever the sensor signal is above a preset threshold value. In some cases, a controller can further take into account a master lockout signal when making the determination about whether to lock or unlock the lockable hydraulic spring. When the master lockout signal is on or above a certain threshold, the controller can refuse to unlock the hydraulic spring. A master lockout signal can be applied by a master controller to one or more passenger seats. For example, a crewmember of an aircraft may be able to use the master controller to enable or disable seatback reclining for all passenger seats, individual passenger seats, or certain select passenger seats. In some cases, a controller can make a determination about whether to lock or unlock the lockable hydraulic spring further based on a position signal from a support position sensor. The support position sensor can be capable of determining a position of the support (e.g., seatback). For example, when a master lockout signal is on or above a threshold, the controller can refuse to unlock the hydraulic spring only when the seatback is in a stowed (e.g., upright) position, but may still allow the hydraulic spring to unlock when the seatback is in a deployed (e.g., reclined) position. Therefore, the seatback may be returned to a stowed position even when the master lockout is active. In some cases, the controller may be coupled to the master controller to relay passenger seat data to the master controller, such as information related to sensed tactile inputs, the position of the support, the status of the lockable hydraulic spring, or other diagnostic or seat-related information.

In some cases, an indicator can be provided proximate the sensor, such as to indicate to a passenger the location of the sensor. The indicator can include an illumination source capable of providing light viewable by a passenger. The illumination source can be coupled to a surface or placed behind a surface (e.g., opposite the surface from a passenger) and viewable through a transparent, translucent, or open window. Examples of suitable illumination sources include light emitting diodes (LEDs), electroluminescent sources, radioluminescent sources (e.g., tritium-filled fluorescent tubes), and others. In some cases, an illumination source can include one or more illumination sources coupled together or positioned proximate one another. In some cases, the illumination source can be coupled to and controlled by the controller. In some cases, the illumination source can be illuminated in different fashions based on a master lockout signal. For example, the illumination source may illuminate as blue when the master lockout is inactive and thus a tactile input would unlock the lockable hydraulic spring, however the illumination source may illuminate as red when the master lockout is active and a tactile input would not be able to unlock the lockable hydraulic spring.

In some cases, electronically-activated support positioning systems, as disclosed herein, can be incorporated into passenger seats during initial construction of the seat. In some cases, electronically-activated support positioning systems can be provided as a kit that can be incorporated into a passenger seat, such as to replace an existing mechanically-controlled support positioning system.

In some cases, a feedback sensation can be provided to a user to indicate that a tactile input has been received or that the lockable hydraulic spring has been actuated, such as to an unlocked state. This feedback sensation can be useful to indicate to the passenger that the portion of the passenger seat is unlocked and thus can be maneuvered (e.g., that the seatback can be reclined). The feedback sensation can be tactile (e.g., a vibration or tactile button click), auditory (e.g., a beep or audible button click), visual (e.g., illumination of a light), or otherwise. The feedback sensation can be provided by a feedback actuator that can provide the feedback sensation passively or actively. A feedback actuator can be a feature of another component or can be its own component.

A passive feedback sensation may be generated without the need for an electrically controlled feedback actuator. Examples of passive feedback actuators can include a biased flap that produces an audible or tactile click when a microbutton is depressed and/or released; a grooved pattern on a feature of an armrest that interacts with a tab of an armrest when the tab is depressed and deflected, causing the tab to grate across the grooved pattern and generate audible or tactile feedback; and a feature associated with a linear actuator or locking pin of a lockable hydraulic spring that generates a noise or tactile vibration when the locking pin is depressed.

An active feedback actuator can provide a feedback sensation in response to receiving a feedback control signal. A feedback control signal can be sent from a controller, from a sensor near the hydraulic spring, from the tactile input sensor, or otherwise. Examples of active feedback actuators can include tactile actuators (e.g., vibration motors or tactile linear actuators), speakers, lights, illumination sources, and the like. Active feedback actuators can be placed in any convenient location. Examples of some particular active feedback actuators can include illumination sources on or in the proximity of a passenger seat (e.g., on an overhead control panel); a speaker on, in, or in the proximity of a passenger seat; and a tactile linear actuator in an armrest, seat bottom, or seatback of a passenger seat. In some cases, an active feedback actuator is located on another structure, such as a bulkhead, an overhead control panel, or a monitor. For example, upon sensing a tactile input or upon unlocking a hydraulic spring, a feedback control signal can be provided to a feedback actuator that is a monitor (e.g., a screen mounted in the seatback of a forward-positioned passenger seat or mounted in a forward-positioned bulkhead) and the monitor can display an icon indicating that the seatback is unlocked and can be manipulated.

In some cases, multiple portions of a passenger seat, such as a seatback and a legrest, can be controllable by tactile input. When multiple portions of a passenger seat are controllable by tactile input, a single sensor can be used to control two or more portions of the passenger seat. In some cases, multiple feedback actuators can be used to provide separate feedback sensations for each of the portions of the passenger seat that are controllable by tactile input. In some cases, separate feedback sensations can be distinguishable from one another to be indicative of which portion of the passenger seat is unlocked (e.g., by visually displaying different lights, by vibrating different portions of the passenger seat, by generating different sounds, or the like). In some cases, multiple portions of a passenger seat can be controllable by tactile input from multiple sensors (e.g., two or more buttons placed in proximity to one another). In such cases, separate feedback sensations can be provided as indicated above, or a single, common feedback sensation can be provided whenever any portion of the passenger seat is unlocked.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is an axonometric view of a set 100 of passenger seats 102 having electronically-activated recline controls 110 according to certain aspects of the present disclosure. The set 100 is shown with three passenger seats 102, although any number of seats 102 may be used. The set 100 can be used to form rows of seats in a vehicle, such as an aircraft.

Each passenger seat 102 can include a seat bottom 104 and a seatback 106 supported by a support frame 112. Each passenger seat 102 can include at least one armrest 108. In some cases, one or more passenger seats 102 of a set 100 can include two armrests 108. In some cases, an electronically-activated recline control 110 for a particular passenger seat 102 is positioned within or incorporated into an armrest 108 adjacent the passenger seat 102. In some cases, the electronically-activated recline control 110 is oriented to face inwards towards the passenger seat 102, although other orientations can be used.

In some cases, an electronically-activated recline control 110 for a particular passenger seat 102 can be located on structures other than an armrest 108. For example, an electronically-activated recline control 110 can be incorporated into a wired or wireless controller separate from the passenger seat 102, such as a handheld remote control or a control panel of a nearby structure (e.g., a wall, a seatback of an adjacent passenger seat, a ceiling fixture).

Figure 2:
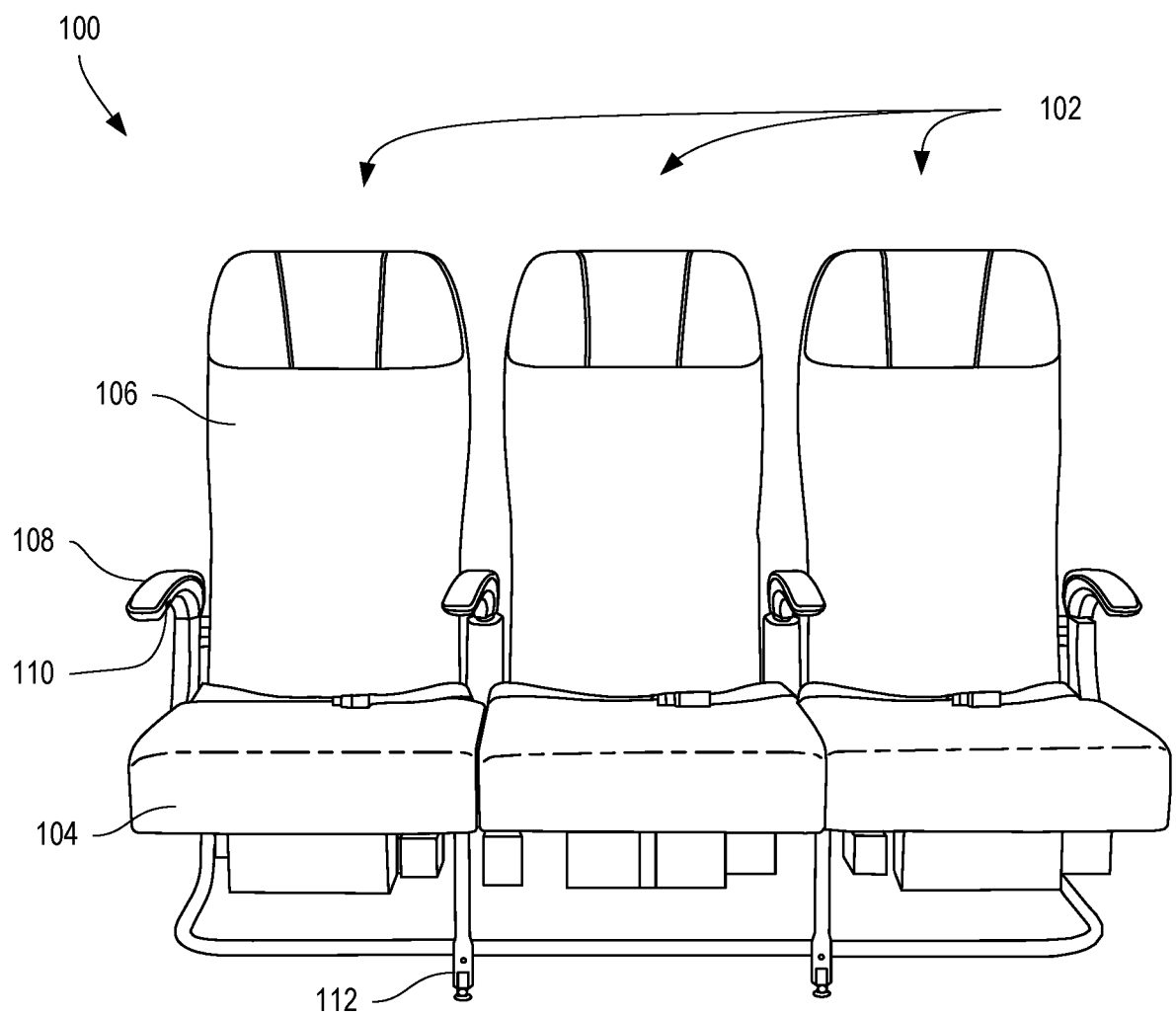
FIG. 2 is a front view of the set of passenger seats of FIG. 1 according to certain aspects of the present disclosure.

FIG. 2 is a front view of the set 100 of passenger seats 102 of FIG. 1 according to certain aspects of the present disclosure. Each passenger seat 102 is shown having a seat bottom 104 and a seatback 106 supported by a support frame 112. Electronically-activated recline controls 110 are shown incorporated into armrests 108 of the passenger seats 102.

Figure 3:
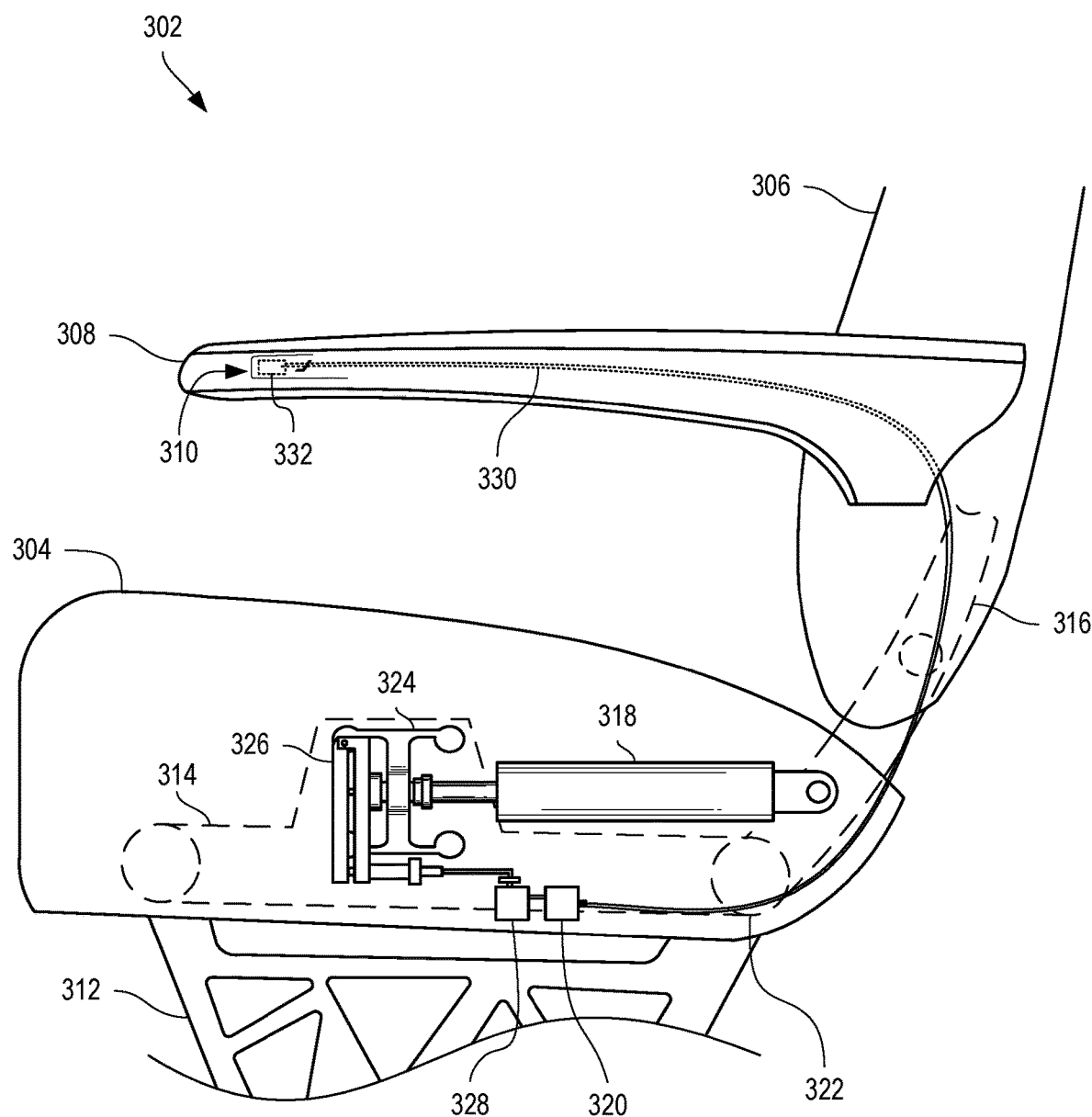
FIG. 3 is a partial cutaway side view of a passenger seat having electronically-activated recline controls with a seatback in a stowed position according to certain aspects of the present disclosure.

FIG. 3 is a partial cutaway side view of a passenger seat 302 having electronically-activated recline controls 310 with a seatback 306 in a stowed position according to certain aspects of the present disclosure. Some portions of the elements shown in FIG. 3 have been removed or truncated for purposes of clarity. The seatback 306 is shown in a stowed, or upright, position. The seatback 306 can be pivotally attached to the support frame 312 at a pivot 322. In some cases, an upper frame 316 supports the seatback 306 and is pivotally coupled to a lower frame 314 at the pivot 322. A lockable hydraulic spring 318 (e.g., a recline hydrolock) can be coupled to the upper frame 316 to control movement of the upper frame 316, and thus the seatback 306, about the pivot 322. In some cases, the lockable hydraulic spring 318 can be located within, under, adjacent, or proximate a seat bottom 304, although it may be positioned in other locations. While FIG. 3 shows one possible structure for pivotally supporting seatback 306, including upper frame 316 coupled to lower frame 314 at pivot 322, the aspects and features of the present disclosure can be used with other structures for movably supporting a portion of a passenger seat, such as a seatback, in other fashions with additional or different mechanical arrangements that still use one or more lockable hydraulic springs 318 to control movement of the portion of the passenger seat (e.g., seatback).

Figure 4:
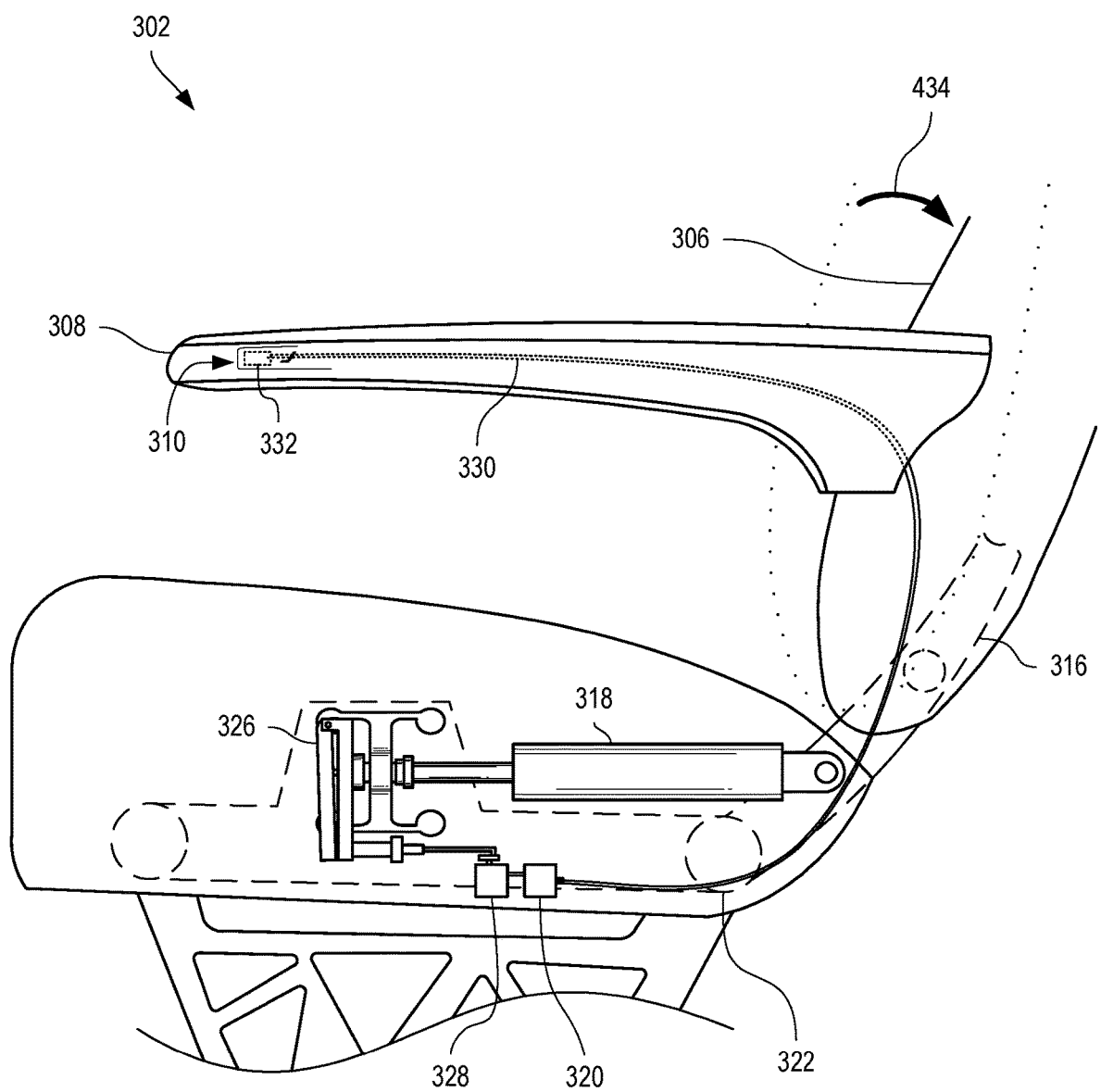
FIG. 4 is a partial cutaway side view of the passenger seat of FIG. 3 with the seatback in a deployed position according to certain aspects of the present disclosure.

The lockable hydraulic spring 318 can be coupled, opposite the upper frame 316, to a bracket 324, which is in turn secured to the lower frame 314. Thus, any reclining of the seatback 306 (e.g., by pivoting the upper frame 316 about pivot 322) requires extension of the lockable hydraulic spring 318. When the lockable hydraulic spring 318 is unlocked, the seatback 306 may be able to be positioned into the deployed position, as seen in FIG. 4. When the lockable hydraulic spring 318 is locked, substantial force from the lockable hydraulic spring 318 may prevent movement of the seatback 306 to the deployed position.

The lockable hydraulic spring 318 may be actuatable between at least two lock states—unlocked and locked—by a lock actuator. Any suitable lock actuator may be used. The type of lock actuator may depend on the mechanism by which the lockable hydraulic spring 318 is actuated. As depicted in FIG. 3, the lockable hydraulic spring 318 is actuated by depression of a locking pin located at a first end (e.g., leftmost end as seen in the figure) of the lockable hydraulic spring 318. The locking pin can be depressed by deflecting a hinge 326 into the locking pin through the use of a servo 328 or other actuator (e.g., a linear actuator). The lock actuator can include the hinge 326 and the servo 328, as well as any necessary related parts. In some cases, a lock actuator can include a linear actuator (e.g., a piezoelectric actuator), a valve actuator, or other device suitable for actuating a lockable hydraulic spring 318 to alter or set the lock state of the lockable hydraulic spring 318.

Electronically-activated recline controls 310 can be located within armrest 308. A sensor 332 can be positioned within the armrest 308, such as near a distal end (e.g., leftmost end as seen in the figure) of the armrest 308. A cable 330 can couple the sensor 332 to a controller 320 to convey electrical signals. The cable 330 can include one or more wires. The controller 320 can be located in any suitable location, such as in, under, adjacent, or proximate the seat bottom 304; in, under, adjacent, or proximate the armrest 308; incorporated with the sensor 332 (e.g., on a single circuit board); incorporated with the servo (e.g., within a single housing); or elsewhere.

A passenger can apply a tactile input at a target zone proximate the sensor 332. When the sensor 332 is located within an armrest 308, examples of applying a tactile input can include squeezing the armrest 308 or applying pressure to armrest 308 at the target zone. The sensor 332 can detect the tactile input and provide a sensor signal through cable 330 to the controller 320. The controller 320 can then transmit a control signal to the servo 328 to unlock the lockable hydraulic spring 318 and allow the seatback 306 to recline to a deployed position.

FIG. 4 is a partial cutaway side view of the passenger seat 302 of FIG. 3 with the seatback 306 in a deployed position according to certain aspects of the present disclosure. Some portions of the elements shown in FIG. 4 have been removed or truncated for purposes of clarity. A depiction of where the seatback 306 would be if in a stowed position is depicted in sparse-dotted lines. The reclining action of the seatback 306 between the stowed (e.g., upright) position and deployed (e.g., reclined) position is indicated by arrow 434. While FIG. 4 shows one possible structure for pivotally supporting seatback 306, including upper frame 316 coupled to lower frame 314 at pivot 322, the aspects and features of the present disclosure can be used with other structures for movably supporting a portion of a passenger seat, such as a seatback, in other fashions with additional or different mechanical arrangements that still use one or more lockable hydraulic springs 318 to control movement of the portion of the passenger seat (e.g., seatback).

A tactile input applied to the electronically-activated recline controls 310 can be detected by sensor 332, which can provide a sensor signal via cable 330 to controller 320. The controller 320, upon receiving the sensor signal, can transmit a control signal to servo 328, which can pull the hinge 326 to depress the locking pin of the lockable hydraulic spring 318, thus actuating the lockable hydraulic spring 318 into an unlocked state. In the unlocked state, the lockable hydraulic spring 318 is able to expand or contract. As shown in FIG. 4, force has been applied to expand the lockable hydraulic spring 318, thus pivoting the upper frame 316, and thus the seatback 306, about pivot 322.

Figure 5:
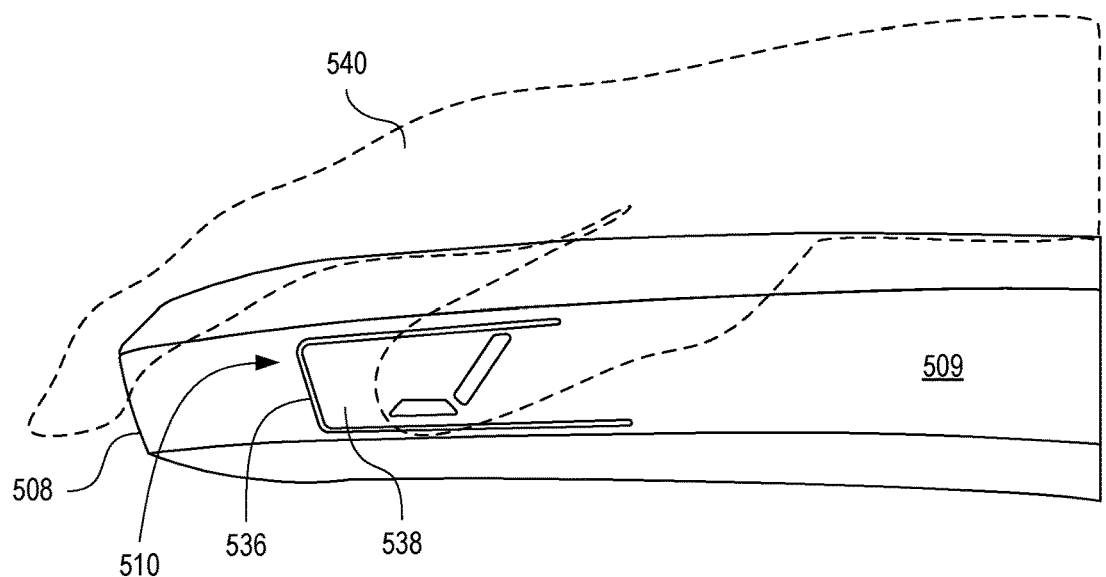
FIG. 5 is a close up side view depicting the use of an armrest with an electronically-activated recline control according to certain aspects of the present disclosure.

FIG. 5 is a close up side view depicting the use of an armrest 508 with an electronically-activated recline control 510 according to certain aspects of the present disclosure. The armrest 508 can include one or more surfaces 509, such as a sidewall. A deflectable tab 538 can be formed in surface 509 of the armrest 508 by creating a separation 536 that at least partially defines the boundaries of the deflectable tab 538. The separation 536 can be formed in any suitable way, such as through molding, cutting, punching, or the like. The separation 536 can be an opening that passes entirely through the surface 509. In some cases, the separation 536 can include a flexible barrier to keep dust or contaminants from entering the interior of the armrest 508.

A passenger 540 can depress on the deflectable tab 538 to deflect the deflectable tab 538 towards the interior of the armrest 508. The use of a deflectable tab 538, as opposed to a mechanical button or the like, can improve the design options, cost to manufacture, weight cost, and other factors related to incorporating a recline control mechanism into an armrest 508.

Figure 6:
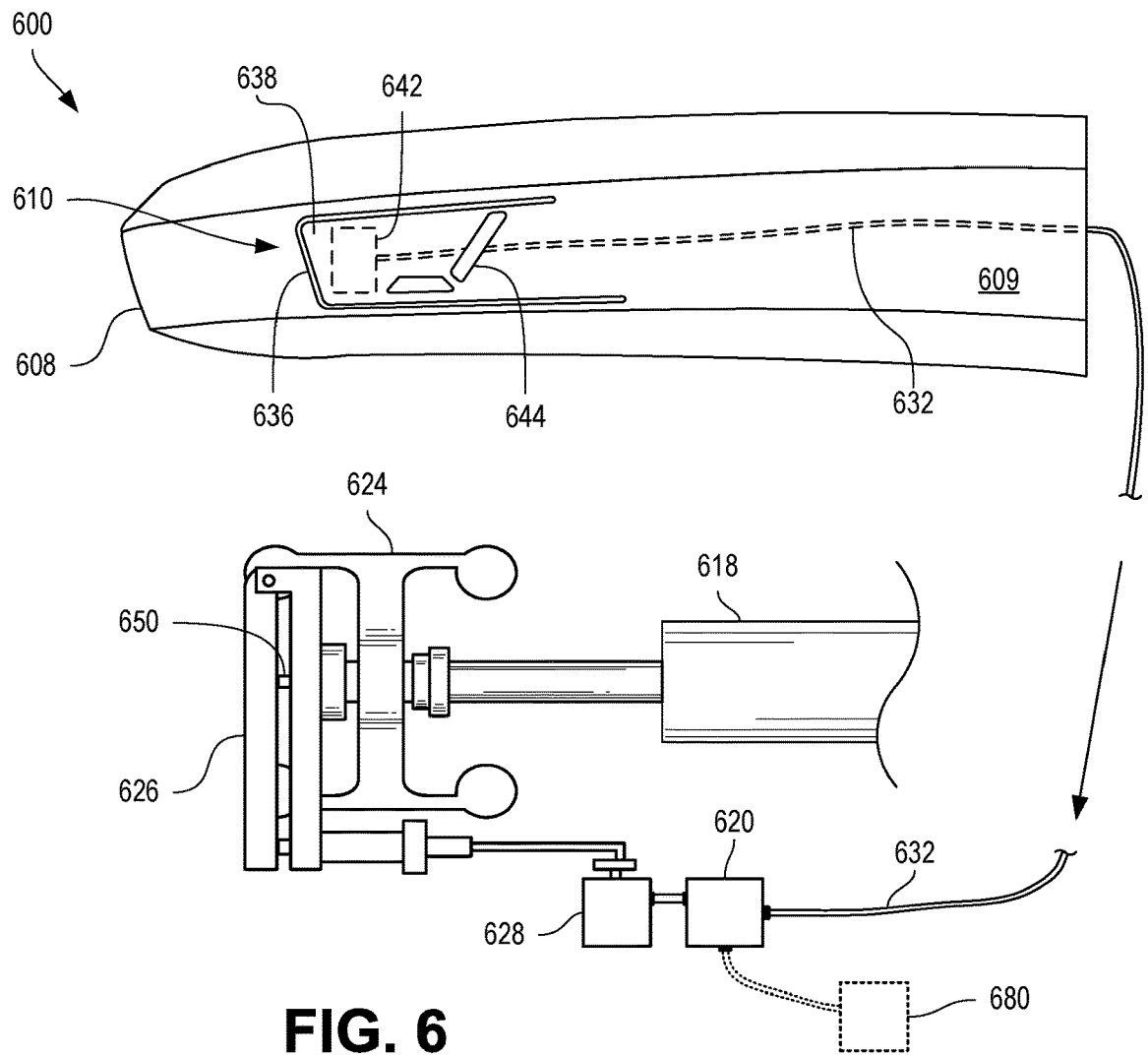
FIG. 6 is a close up side view of an electronically-activated recline control system according to certain aspects of the present disclosure.

FIG. 6 is a close up side view of an electronically-activated recline control system 600 according to certain aspects of the present disclosure. The system can include a sensor 642 coupled to a controller 620 which is coupled to a servo 628 for actuating a lockable hydraulic spring 618. The sensor 642 can be incorporated into an armrest 608. The sensor 642 can be positioned proximate a deflectable tab 638 formed in a surface 609 of the armrest 608. The deflectable tab 638 can be formed by a separation 636 in the surface 609 of the armrest 608. The sensor 642 can be positioned to detect deflection of the deflectable tab 638.

An indicator 644 can be located proximate the sensor 642, such as on the deflectable tab 638. The indicator 644 can be a feature that provides a tactile and/or visual indication of where a tactile input should be applied in order to operate the electronically-activated recline control system 600. For example, the indicator 644 can be a sticker in the shape of a reclined seat. In some cases, the indicator 644 can include a raised portion of the surface 609 or a window in the surface 609. In some cases, the indicator 644 can include a transparent, translucent, or open window through which light may pass.

When the sensor 642 detects a tactile input (e.g., deflection of the deflectable tab 638), a sensor signal can be transmitted to the controller 620 via cable 632. The controller 620 can optionally perform further processing to determine whether or not to send a control signal. The controller 620 can send a control signal along an additional cable to the servo 628. The servo 628 can actuate (e.g., pull on) the hinge 626 to depress the locking pin 650 of the lockable hydraulic spring 618. At least a portion of the hydraulic spring 618 (e.g., an end support) can provide an anchor for one arm of the hinge 626, while the other arm of the hinge 626 is able to move to depress the locking pin 650 or move away from the locking pin 650.

In some cases, a feedback actuator can provide a feedback sensation indicative that a tactile input has been received or that the hydraulic spring 618 has been unlocked (e.g., a control signal has been sent). In some cases, deflectable tab 638 can include features that interact with mechanical features (e.g., ribs or grooves) of an adjacent part (e.g., an interior portion of the armrest) to passively generate a tactile or audible feedback sensation when the deflectable tab 638 is depressed. In some cases, the sensor 638 can include mechanical features that interact to produce a tactile or audible feedback sensation (e.g., button click) when the deflectable tab 638 is depressed, such as sufficiently depressed to trigger transmission of a sensor signal.

In some cases, controller 620 can generate a feedback control signal, which causes active generation of a feedback sensation. In some cases, controller 620 can transmit a feedback control signal to sensor 642, which can include a feedback actuator (e.g., tactile motor) suitable for actively generating a feedback sensation. In some cases, controller 620 can transmit a feedback control signal to a separate feedback actuator 680. Feedback actuator 680 can be a motor, tactile actuator, speaker, monitor (e.g., display panel), illumination source, or the like. Transmission of a feedback control signal can occur by wire or wirelessly.

FIG. 7 is a section-cutaway, top view of an armrest 708 with an electronically-activated recline control 710 in an inactivated position according to certain aspects of the present disclosure. The electronically-activated recline control 710 can include a sensor that is a microswitch 742. The microswitch 742 can include a plunger 746 which, when depressed, generates a signal (e.g., opens or closes a circuit) in cable 732, which can be used to lock or unlock a lockable hydraulic spring. The armrest 708 can include an external surface 709 (e.g., sidewall). A deflectable tab 738 can be formed in the external surface 709 by separation 736.

The surface 709 includes a window 744 located proximate the microswitch 742. The window 744 can be located on the deflectable tab 738. The window 744 can take the shape of a reclining seat. The window 744 can be transparent, translucent, or open. An illumination source 748 can be positioned proximate the window 744, within the interior of the armrest 708. Light provided by the illumination source 748 can pass through window 744 and be visible to a passenger. The illumination source 748 can be powered and/or controlled via cable 732 or via another cable. The illumination source 748 can include one or more illumination sources, such as those described above.

In an inactivated position, the deflectable tab 738 is not deflected sufficiently to depress the plunger 746 of the microswitch 742, and thus the microswitch 742 is not detecting a tactile input.

In some cases, a feedback actuator 780 can be positioned in the armrest 708 to generate a feedback signal. The feedback actuator can be coupled to a controller via cable 732. The feedback actuator 780 can be a vibration motor.

FIG. 8 is a section-cutaway, top view of an armrest 708 with an electronically-activated recline control 710 in a depressed position according to certain aspects of the present disclosure. In the depressed position, the deflectable tab 738 is deflected sufficiently to depress the plunger 746 of the microswitch 742, and thus cause the microswitch 742 to detect a tactile input. Upon detecting the tactile input, the microswitch 742 can generate a sensor signal (e.g., open or close a circuit) in cable 732. The deflectable tab 738 can be deflected by a passenger, such as by squeezing or applying pressure to the armrest 708 at the deflectable tab 738.

Because a tactile input has been detected, the controller can transmit a control signal to the feedback actuator 780, causing the feedback actuator 780 to generate a feedback sensation 782. The feedback sensation 782 can be a vibration, although other sensations may be generated. When the feedback sensation 782 is a vibration, the vibrations can propagate from the feedback actuator 780 into the armrest 708 so that it may be felt by a passenger depressing the deflectable tab 738.

Figure 9:
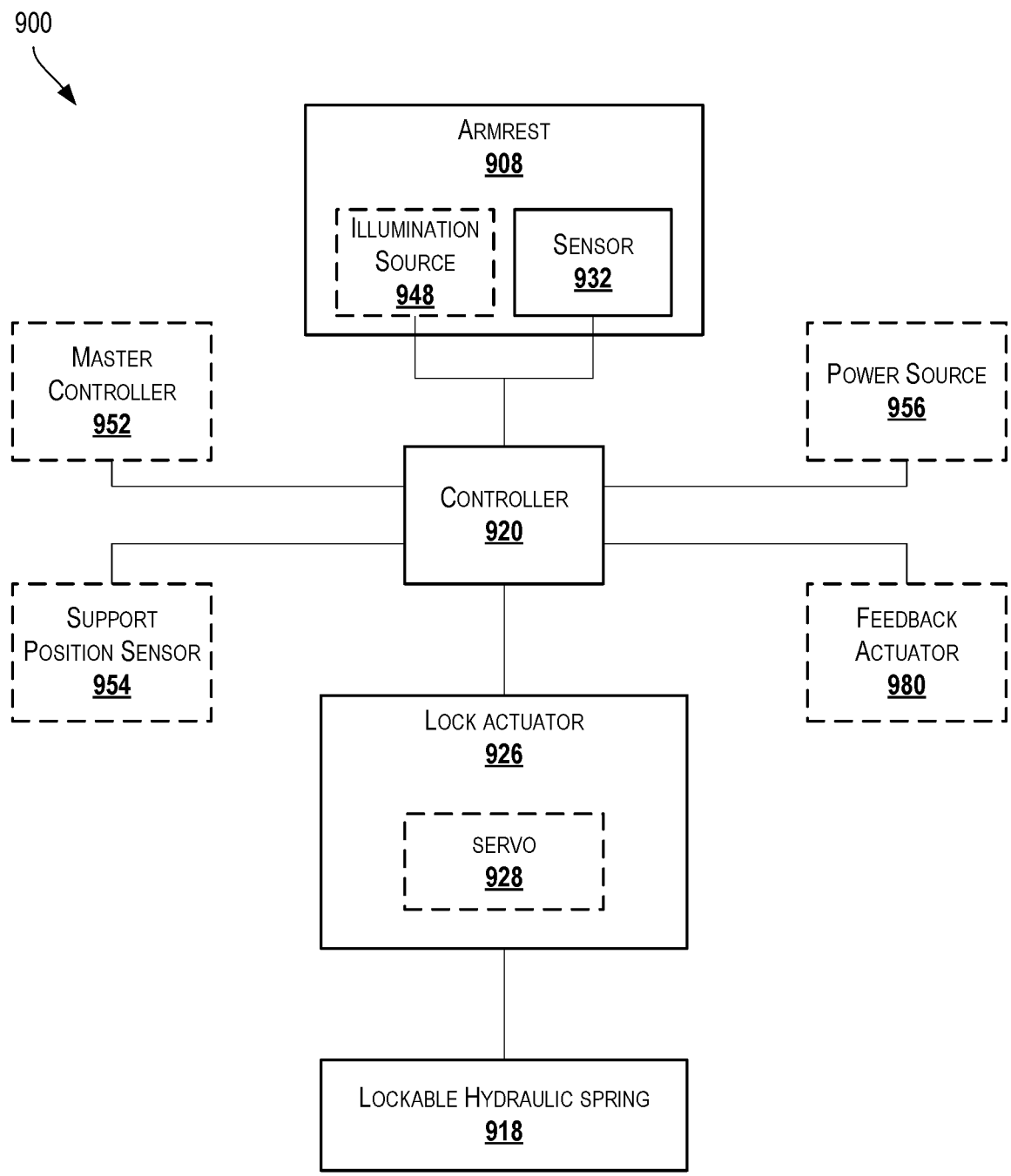
FIG. 9 is a schematic diagram depicting an electronically-activated recline control system according to certain aspects of the present disclosure.

FIG. 9 is a schematic diagram depicting an electronically-activated recline control system 900 according to certain aspects of the present disclosure. The system 900 can include a controller 920 coupled to a sensor 932 and a lock actuator 926. The sensor 932 can be incorporated in an armrest 908 or elsewhere. Upon receipt of a sensor signal, from the sensor 932, indicative of a tactile input, the controller 920 can output a control signal to the lock actuator 926 to actuate the lockable hydraulic spring 918.

In some cases, the controller 920 can be implemented using one or more components located within a single or multiple housings. The controller 920 can include one or more processors, microcontrollers, or the like.

In some cases, the lock actuator 926 can include a servo 928 coupled to the controller 920 to receive the control signal. Other types of lock actuators 926 can be used.

In some cases, an illumination source 948 can be positioned proximate the sensor 932, such as within the armrest 908. The illumination source 948 can be coupled to the controller 920.

A power source 956 can be coupled to the controller 920 to provide power to one or more components of the system 900. In some cases, the power source 956 is an internal, self-contained power source, such as a battery or capacitor. In some cases, the power source 956 is a connection to an external power source, such as line power, vehicle power, a power generation source (e.g., turbine or alternator), or the like.

In some cases, the controller 920 can be coupled to a master controller 952. The master controller 952 can be any suitable controller, such as a processor, microcontroller, computer, smartphone, switch, electrical relay, or the like. The master controller 952 can provide a master lockout signal to the controller 920 to disable or enable the ability to unlock the lockable hydraulic spring 918. When the master lockout is active, the controller 920 may disable the ability to unlock the lockable hydraulic spring 918, even if a tactile input is detected by sensor 932. In some cases, the master controller 952 can selectively unlock the lockable hydraulic spring 918 regardless of whether a tactile input is detected by sensor 932. For example, in the case where a flight attendant wishes to easily raise all seatbacks in an aircraft, a single switch can be actuated on a master controller 952 to unlock all lockable hydraulic springs 918 and the flight attendant can walk around and easily manipulate each seatback without having to depress individual controls for each seat.

In some cases, the controller 920 is coupled to a support position sensor 954. The support position sensor 954 can be any sensor suitable for detecting a position of the support (e.g., seatback). Suitable support position sensors 954 include angle sensors, rotation sensors, distance sensors, proximity sensors, touch or pressure sensors, or the like. The support position sensor 954 can provide a position signal to the controller 920, which the controller 920 can use to determine whether or not to allow the lockable hydraulic spring 918 to be unlocked. For example, an upper frame of a seatback may include a magnetic source and a support position sensor 954 that is a hall sensor can be positioned to close a circuit only when the seatback is in a fully stowed (e.g., upright) position. In an example, a controller 920 can be programmed to allow the lockable hydraulic spring 918 to be unlocked, even if the master lockout is active, if the support position sensor 954 is not providing a signal indicative that the seatback is in a stowed position. Therefore, the master lockout can be active (e.g., during landing) to prevent passengers from reclining their seatbacks, but any passenger with a reclined seatback would be able to move their seatback from a reclined position to an upright position.

In some cases, the controller 920 is coupled to a feedback actuator 980 to provide a feedback control signal that causes the feedback actuator 980 to generate a feedback sensation. In some cases, the feedback actuator 980 can be the illumination source 948 within the armrest 908 and the feedback sensation can be the light generated by the illumination source 948. The feedback actuator 980 can generate any suitable feedback sensation, including any combination of tactile, audible, or visual sensations.

Each of the components of system 900 can be embodied in multiple sub-components or can be joined together in any suitable combination.

Figure 10:
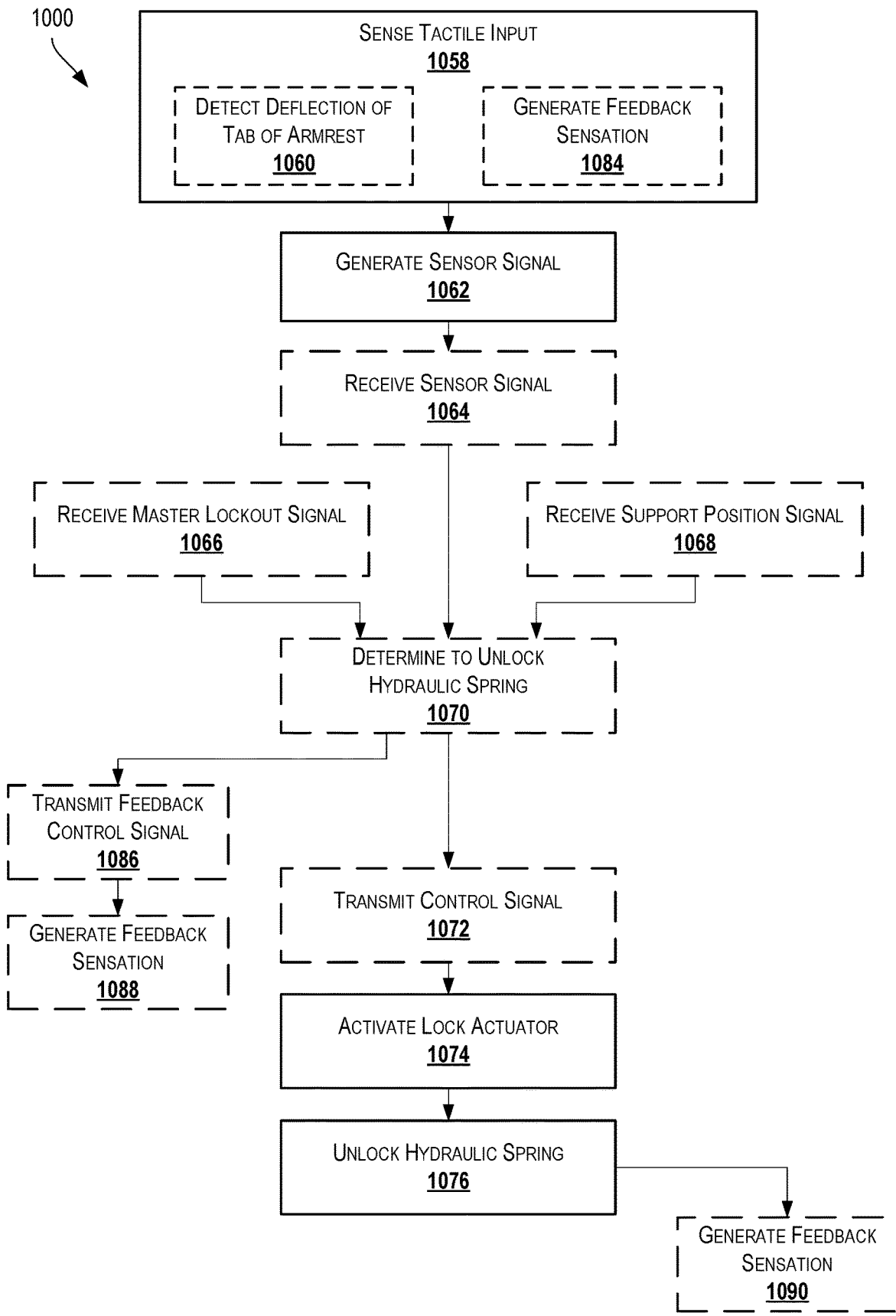
FIG. 10 is a flowchart depicting a method of electronically sensing and electronically actuating a recline control system according to certain aspects of the present disclosure.

FIG. 10 is a flowchart depicting a method 1000 of electronically sensing and electronically actuating a recline control system according to certain aspects of the present disclosure. At block 1058, a tactile input is sensed. The tactile input can be sensed as disclosed herein, such as by depression of the plunger of a microswitch. In some cases, sensing the tactile input at block 1058 includes detecting deflection of a deflectable tab of an armrest at block 1060.

At block 1062, a sensor signal is generated. The sensor signal can be generated by the sensor that detects the tactile input at block 1058. In some cases, the sensor signal can be transmitted, by wire or wirelessly, directly to a lock actuator to activate the lock actuator at block 1074.

In some cases, the sensor signal can be transmitted, by wire or wirelessly, to a controller. In such cases, one or more of optional blocks 1064, 1066, 1068, 1070, or 1072 may be employed.

At block 1064, the sensor signal is received by a controller. In some cases, the controller can automatically transmit a control signal 1072 in response to receiving the sensor signal at block 1064. In some cases, the controller can determine to unlock the hydraulic spring at block 1070, in which case transmitting the control signal at block 1072 occurs in response to determining to unlock the hydraulic spring at block 1070. Determining to unlock the hydraulic spring at block 1070 can be based on the sensor signal received at block 1064.

In some cases, a master lockout signal is received by the controller at block 1066. In such cases, determining to unlock the hydraulic spring at block 1070 can further be based on the master lockout signal received at block 1066. In an example, a control signal is transmitted at block 1072 only when the sensor signal received at block 1064 is indicative of detection of a tactile input and the master lockout signal received at block 1066 is indicative that the master lockout is inactive (e.g., no lockout signal is received).

In some cases, a support position signal is received by the controller at block 1068. The support position signal can be indicative of the position of the support (e.g., a seatback) that is positionable when the hydraulic spring is unlocked. In such cases, determining to unlock the hydraulic spring at block 1070 can further be based on the support position signal received at block 1068. In an example, even when the master lockout signal received at block 1066 is indicative that the master lockout is active, a control signal may still be transmitted at block 1072 when the sensor signal received at block 1064 is indicative of detection of a tactile input and the support position signal received at block 1068 is indicative that the support is not in a stowed position.

At block 1074, the lock actuator can be activated, which can unlock the hydraulic spring at block 1076. In an example, activating the lock actuator at block 1074 can include activating a servo that pulls on a hinge to depress a locking pin of the hydraulic spring, which unlocks the hydraulic spring at block 1076. Once unlocked, the hydraulic spring is able to extend or contract, thus allowing the position of the support (e.g., seatback) to be moved.

In some cases, when the tactile input ceases to be sensed at block 1058, lock actuator can cease to be activated at block 1074 or can be activated in an alternate fashion (e.g., in a reverse direction) to lock the hydraulic spring.

In some cases, feedback sensations can be generated to provide indication that a tactile input has been received or that the hydraulic spring has been unlocked.

In some cases, sensing the tactile input at block 1058 can include generating a feedback sensation at block 1084. Generation of the feedback sensation at block 1084 can be passive (e.g., due to mechanical deflection of a button or deflectable tab) or active (e.g., depression of a button, in addition to generating the sensor signal at block 1062, can provide a feedback control signal that generates the feedback sensation at block 1084).

In some cases, a feedback control signal can be transmitted at block 1086 in response to the determination to unlock the hydraulic spring at block 1070. A feedback sensation can be generated at block 1088 when the feedback control signal transmitted at block 1086 is received, such as by a feedback actuator.

In some cases, a feedback sensation can be generated at block 1090 in response to unlocking the hydraulic spring at block 1076. The feedback sensation can be passively generated (e.g., due to mechanical deflection of a hinge coupled to a locking pin of a hydraulic spring) or actively generated (e.g., a feedback control signal can be sent to a feedback actuator by a switch coupled to a hinge in a fashion that causes the switch to complete a circuit when the hinge depresses the locking pin).

Feedback sensations can be generated in other ways and based on other portions of method 1000.

Figure 11:
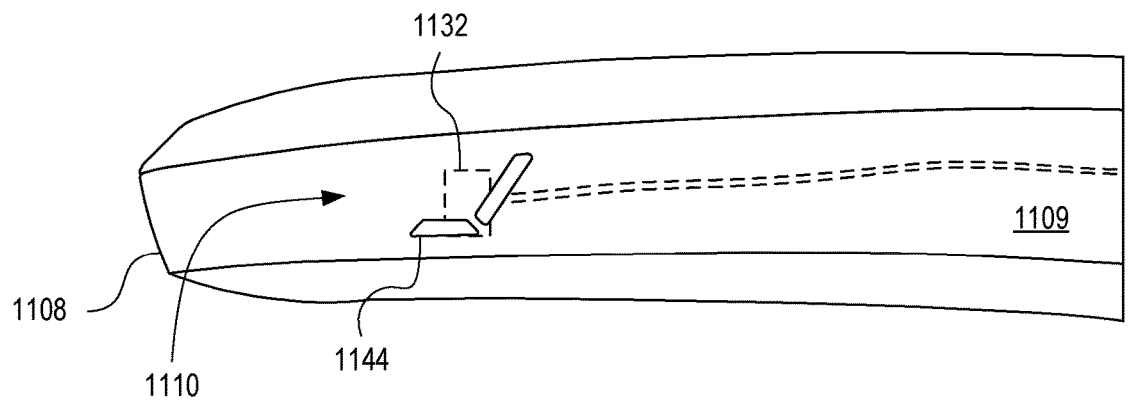
FIG. 11 is a close up side view of an electronically-activated recline control system according to certain aspects of the present disclosure.

FIG. 11 is a close up side view of an electronically-activated recline control system 1100 according to certain aspects of the present disclosure. The system can include a sensor 1132 incorporated into an armrest 1108. The sensor 1132 may be any sensor suitable for detecting a tactile input through the external surface 1109 of the armrest 1108. For example, the sensor 1132 may be a proximity sensor capable of detecting when a passenger is pressing against the external surface 1109 proximate the sensor 1132. As another example, the sensor 1132 can be a pressure sensor capable of detecting small deflections of the external surface 1109 proximate the sensor 1132. An indicator 1144 can be located proximate the sensor 1132 to provide an indication of where a passenger's tactile input should be directed.

Figure 12:
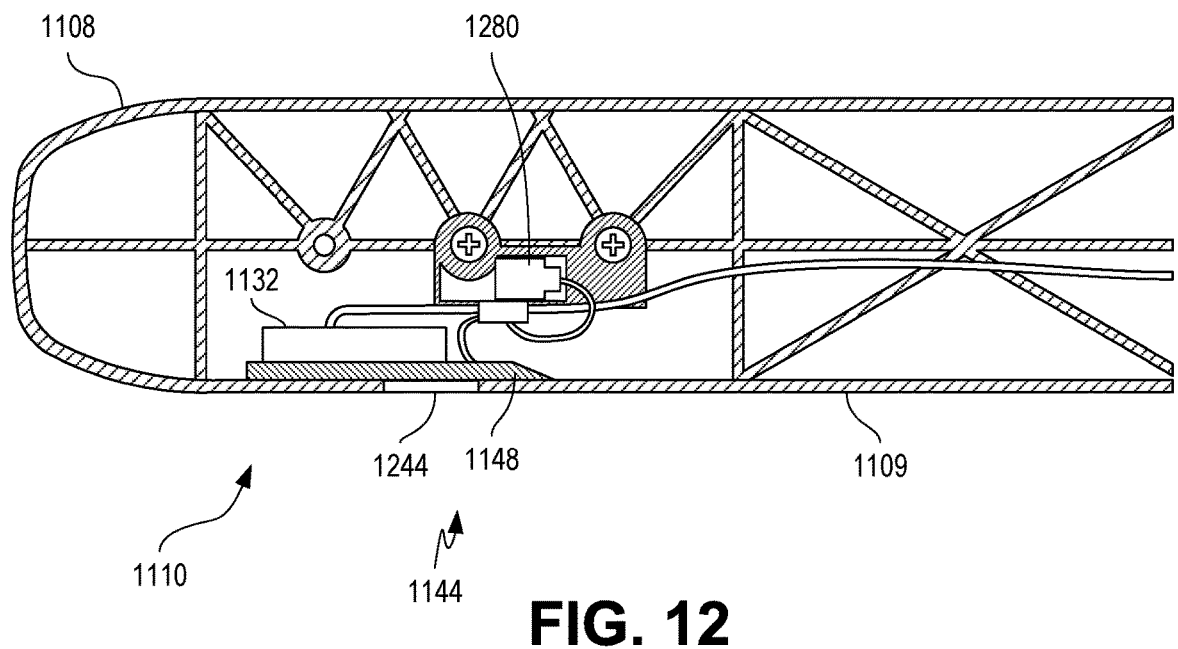
FIG. 12 is a section-cutaway, top view of the armrest of FIG. 11 according to certain aspects of the present disclosure.

FIG. 12 is a section-cutaway, top view of the armrest 1108 of FIG. 11 according to certain aspects of the present disclosure. The electronically-activated recline control 1110 can include a sensor 1132 that may be any sensor suitable for detecting a tactile input through the external surface 1109 of the armrest 1108. For example, sensor 1132 can be a capacitive inductance sensor.

The surface 1109 can include an indicator 1144 that includes an illumination source 1148 within the armrest 1108 and a window 1244 through the surface 1109, through which light from the illumination source 1148 can be seen.

A feedback actuator 1280 can be positioned within the armrest 1108 to provide feedback sensations as described in further detail herein.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A recline control system, comprising:
    a lockable hydraulic spring couplable to a passenger seat to control movement of a portion of the passenger seat, the lockable hydraulic spring actuatable between a locked state and an unlocked state;
    a lock actuator coupled to the lockable hydraulic spring for controlling a lock state of the lockable hydraulic spring;
    a sensor for sensing a tactile input, the sensor operatively coupled to the lock actuator to initiate actuation of the lockable hydraulic spring in response to sensing the tactile input;
    a controller operatively coupled between the sensor and the lock actuator; and
    a feedback actuator operatively coupled to the controller to generate a feedback sensation associated with actuation of the lockable hydraulic spring to the unlocked state.

2. The recline control system of claim 1, wherein the portion of the passenger seat is a seatback and wherein the lockable hydraulic spring is couplable to the seatback to control reclining of the seatback.

3. The recline control system of claim 1, wherein the lockable hydraulic spring includes a locking pin for controlling the lock state of the lockable hydraulic spring, and wherein the lock actuator includes an actuator coupled to a hinge, the actuator actuatable to deflect the hinge to depress the locking pin.

4. The recline control system of claim 1, wherein the sensor includes a button mountable in an armrest of the passenger seat to detect a deflection of a surface of the armrest, and wherein the tactile input is the deflection of the surface of the armrest.

5. The recline control system of claim 1, wherein the sensor is mountable in an armrest of the passenger seat to detect pressure applied to a surface of the armrest, and wherein the tactile input is the pressure applied to the surface of the armrest.

6. The recline control system of claim 1, wherein the sensor is mountable in an armrest of the passenger seat, and wherein the recline control system further comprises an illumination source positionable proximate the sensor.

7. The recline control system of claim 1, further comprising a position sensor for determining a position of the portion of the passenger seat.

8. A passenger seat, comprising:
    a seat frame;
    a support coupled to the seat frame and maneuverable between a stowed position and a deployed position;
    a lockable hydraulic spring couplable to the support to control movement of the support between the stowed position and the deployed position, the lockable hydraulic spring actuatable between a locked state and an unlocked state;
    a lock actuator coupled to the lockable hydraulic spring for controlling a lock state of the lockable hydraulic spring;
    a sensor for sensing a tactile input, the sensor operatively coupled to the lock actuator to initiate actuation of the lockable hydraulic spring in response to sensing the tactile input; and
    an armrest coupled to the seat frame, the armrest having a separation in an external surface of the armrest forming a deflectable tab, wherein the sensor includes a button mounted in the armrest to detect deflection of the deflectable tab, and wherein the tactile input is the deflection of the deflectable tab.

9. The passenger seat of claim 8, wherein the support is a seatback pivotally coupled to the seat frame to pivot between the stowed position and the deployed position.

10. The passenger seat of claim 8, wherein the lockable hydraulic spring includes a locking pin for controlling the lock state of the lockable hydraulic spring, and wherein the lock actuator includes an actuator coupled to a hinge, the actuator actuatable to deflect the hinge to depress the locking pin.

11. The passenger seat of claim 8, wherein the sensor is mountable in the armrest to detect pressure applied to a surface of the armrest, and wherein the tactile input is the pressure applied to the surface of the armrest.

12. The passenger seat of claim 8, wherein the sensor is mountable in the armrest, and wherein the passenger seat further comprises an illumination source positionable proximate the sensor.

13. The passenger seat of claim 8, further comprising a controller operatively coupled between the sensor and the lock actuator.

14. The passenger seat of claim 13, further comprising a feedback actuator operatively coupled to the controller to generate a feedback sensation associated with actuation of the lockable hydraulic spring to the unlocked state.

15. The passenger seat of claim 8, further comprising a position sensor for determining a position of the support.

16. A method, comprising:
    sensing a tactile input by a sensor mounted in an armrest of a passenger seat and generating a sensor signal in response to sensing the tactile input;
    determining by a position sensor a position of a portion of the passenger seat and generating a position signal in response to determining the position of the portion of the passenger seat;
    receiving the sensor signal and the position signal by a controller;
    transmitting a control signal in response to receiving the sensor signal and the position signal; and
    activating a lock actuator in response to generating the control signal, wherein activating the lock actuator includes depressing a locking pin of a lockable hydraulic spring.

17. The method of claim 16, further comprising determining, by the controller, to unlock the lockable hydraulic spring based on the sensor signal and the position signal, wherein transmitting the control signal occurs in response to determining to unlock the lockable hydraulic spring.

18. The method of claim 17, further comprising receiving, by the controller, a master lockout signal, wherein determining to unlock the lockable hydraulic spring is further based on the master lockout signal.

19. The method of claim 18, wherein determining to unlock the lockable hydraulic spring is further based on both the master lockout signal and the position signal.

20. The method of claim 16, further comprising transmitting a feedback control signal in association with transmitting the control signal, wherein the feedback control signal, when received by a feedback actuator, causes the feedback actuator to generate a feedback sensation indicative of actuation of the lockable hydraulic spring to an unlocked state.

21. The method of claim 16, wherein activating the lock actuator includes actuating an actuator in response to generating the sensor signal to deflect a hinge, and wherein the hinge depresses the locking pin upon deflection.

22. The method of claim 16, wherein the armrest includes a surface and a separation in the surface that forms a deflectable tab, and wherein sensing the tactile input includes detecting deflection of the deflectable tab.

23. The method of claim 16, wherein the portion of the passenger seat is a seatback and wherein the lock actuator is couplable to the seatback.

* * * * *